Dec. 19, 1967  J. R. WILLSON  3,358,963
AUTOMATIC FUEL CONTROL VALVE
Filed Dec. 2, 1964  4 Sheets-Sheet 1

INVENTOR.
JAMES R. WILLSON
BY
Candor & Candor
HIS ATTORNEYS

Dec. 19, 1967     J. R. WILLSON     3,358,963
AUTOMATIC FUEL CONTROL VALVE
Filed Dec. 2, 1964     4 Sheets-Sheet 2
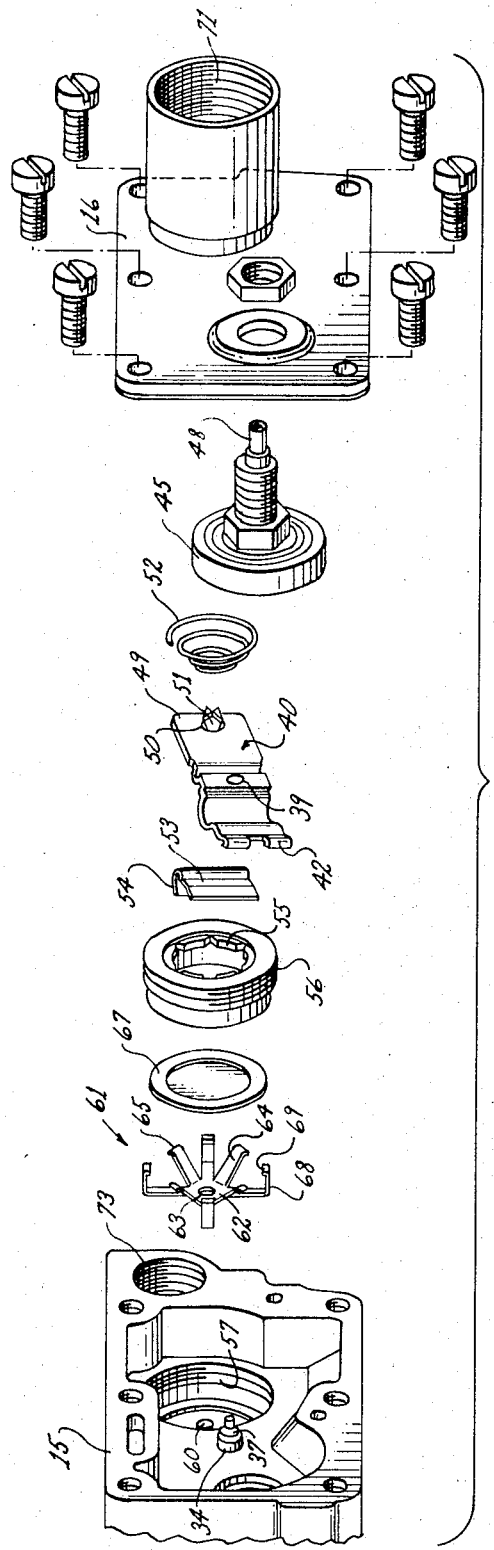
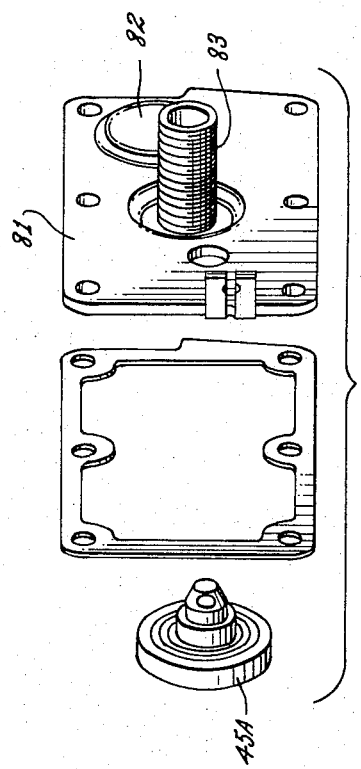
INVENTOR.
JAMES R. WILLSON
BY
HIS ATTORNEYS Dec. 19, 1967   J. R. WILLSON   3,358,963
AUTOMATIC FUEL CONTROL VALVE Filed Dec. 2, 1964   4 Sheets-Sheet 3

INVENTOR.
JAMES R. WILLSON
BY
Cauden & Cauden
HIS ATTORNEYS

United States Patent Office 3,358,963
Patented Dec. 19, 1967

3,358,963
AUTOMATIC FUEL CONTROL VALVE
James R. Willson, Greensburg, Pa., assignor to Robertshaw Controls Company, Richmond, Va., a corporation of Delaware
Filed Dec. 2, 1964, Ser. No. 415,531
8 Claims. (Cl. 251—238)

ABSTRACT OF THE DISCLOSURE

This disclosure relates to a control device for controlling the flow of fuel therethrough in response to the expansion and contraction of a power element acting upon a lever fulcrumed on an axially adjustable fulcrum pin set in various positions thereof by a manual manipulator means, the fulcrumed lever having an end projecting through a valve seat and bearing against a valve member that opens and closes the valve seat for controlling the flow of fuel through the control device. The valve member is urged to its closed position by a onepiece spring means having a plurality of fingers bearing against the valve member to tend to urge the same toward the valve seat, other fingers of the one-piece spring means being disposed around the valve member to hold the same to the spring means.

This invention relates to an improved control device for fuel burning appliances or the like as well as to improved parts for such a control device or the like.

In particular, the control devices of this invention are readily adaptable to control the flow of fuel to the burner means of an oven of a cooking apparatus or to the top burner thereof whereby the parts utilized for the control devices of this invention are substantially interchangeable with minor variations thereof to permit a particular control device to be adapted to a particular application thereof.

Further, the parts of this invention are so constructed and arranged that the same are adapted to be relatively simply and economically manufactured as well as be simply and automatically assembled together to provide the control devices of this invention.

Accordingly, it is an object of this invention to provide an improved control device having one or more of the novel features of this invention as set forth above or hereinafter shown or described.

Another object of this invention is to provide improved parts for such a control device or the like.

Other objects, uses and advantages of this invention are apparent from a reading of this description which proceeds with reference to the accompanying drawings forming a part thereof and wherein:

FIGURE 2 is an exploded perspective view of certain of the parts of the control device illustrated in FIGURE 1.

FIGURE 6 is an exploded perspective view of certain of the parts of the control device of FIGURE 5.

Figure 1:
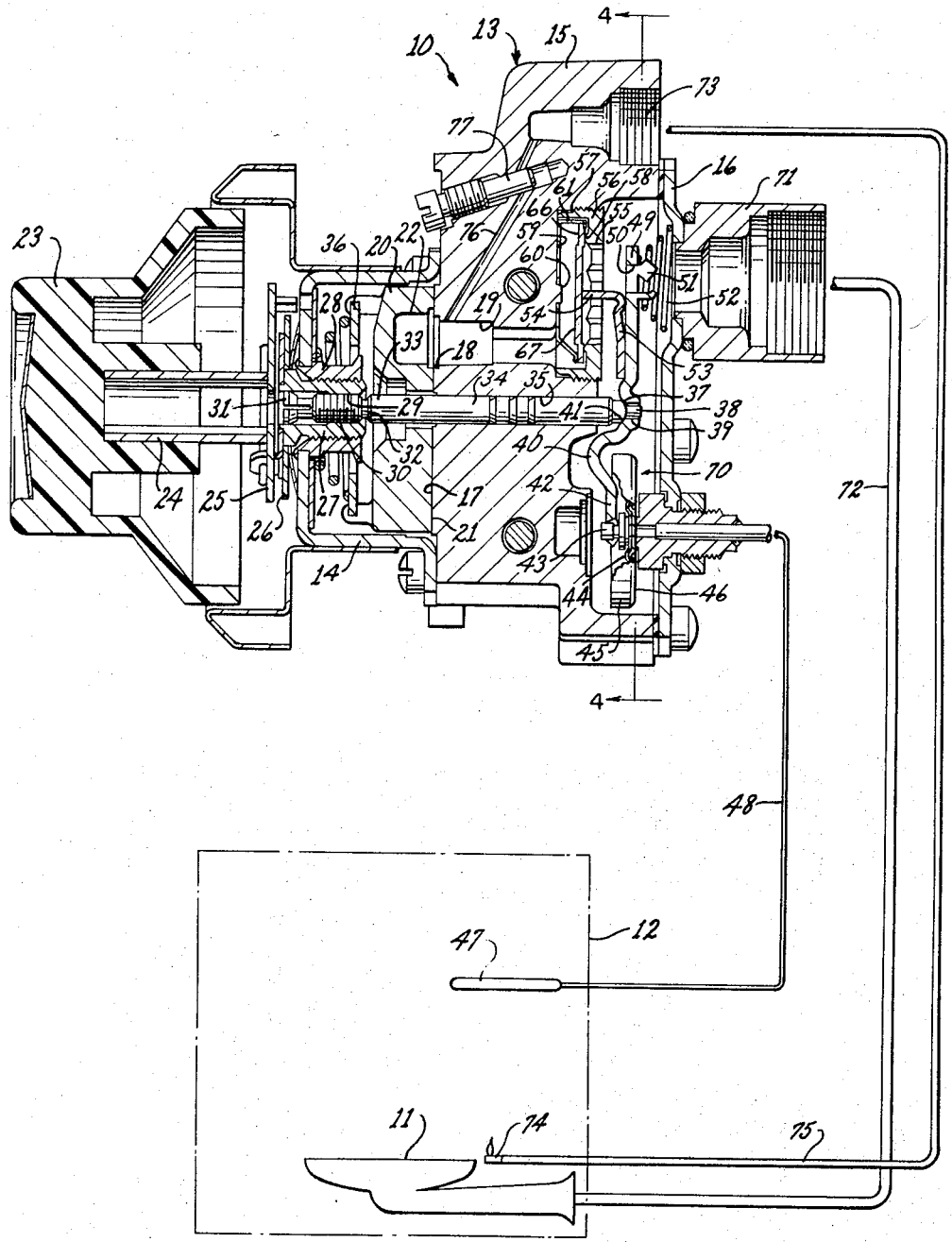
FIGURE 1 is a cross-sectional schematic view illustrating one control device of this invention.
Figure 3:
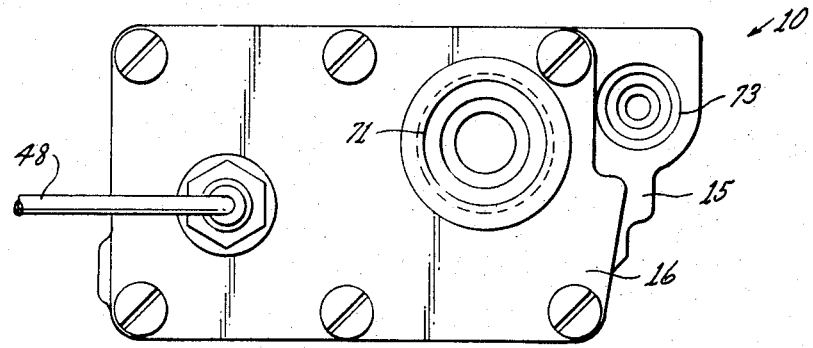
FIGURE 3 is an end view of the control device of FIGURE 1.

While the various features of this invention are hereinafter described and illustrated as being particularly adaptable to provide control devices for cooking apparatus or the like, it is to be understood that the various features of this invention can be utilized singly or in any combination thereof to provide control devices for other types of apparatus or the like.

Therefore, this invention is not to be limited to only the embodiments illustrated in the drawings, because the drawings are merely utilized to illustrate some of the wide variety of uses of this invention.

Referring now to FIGURE 1, an improved control device of this invention is generally indicated by the reference numeral 10 and is utilized to thermostatically control the flow of fuel from a source (not shown) to a main burner means 11 of a cooking oven 12 or the like.

The control device 10 includes a housing means 13 formed of three parts 14, 15 and 16 suitably secured together in the position illustrated in FIGURE 1.

The housing part 15 has an inlet port leading from the source of fuel to a flat surface 17 thereof with the inlet port (not shown) being disposed adjacent a port 18 formed in the surface 17 and being interconnected to a passageway 19 formed in the housing part 15.

A rotatably mounted disc valve 20 has a flat face 21 thereof disposed in sliding and sealing relation with the face 17 of the housing part 15, the valve member 20 having a recess 22 formed in the face 21 thereof to interconnect the inlet port and the port 18 together when the valve member 20 has been rotated to the proper position relative to the housing part 15 by a control knob 23 in a manner hereinafter described.

In particular, the control knob 23 is mounted on a C-shaped shaft 24 fastened to a plate member 25. The plate member 25 is in turn fastened to another plate member 26 carrying a tubular member 27 threadedly received in a tubular member 28 fixed to the housing part 14. The tubular member 27 has an interiorly threaded bore 29 threadedly receiving an adjusting screw 30 having a bifurcated end 31 and a cylindrical end 32 abutting one end 33 of an axially movable fulcrum pin 34 carried in a bore 35 of the housing part 15 for a purpose hereinafter described.

A drive member 36 is operatively interconnected to the valve member 20 and is adapted to be interconnected to the plate 25 by a drive tang (not shown) in any suitable manner so that when the control knob 23 is turned from its off position toward an on position thereof, such rotational movement of the plate 25 causes like rotational movement of the valve member 20 to interconnect together the inlet port with the port 18 to permit fuel to flow into the passageway 19 of the housing part 15, the plate 25 thereafter, being disengaged from the drive member 36 in higher temperature ranges of the control knob 23 in the manner fully set forth in the co-pending patent application, Robertshaw Controls Company Ser. No. 415,264, filed Dec. 2, 1964.

However, when the control knob 23 is rotated back to its off position, the plate-like member 25 again comes in to driving engagement with the drive member 36 to rotate the valve member 20 back to its off position to prevent the inlet port from being interconnected to the passageway 19.

In addition, it can be seen that when the control knob 23 is rotated in an on direction thereof, the tubular member 27 is rotated therewith and, through the threaded relation with the fixed tubular member 28, moves to the left to permit the adjusting screw 30 to move to left therewith under the influence of spring 52 in a manner hereinafter described. Conversely, when the control knob 23 is turned in an off direction, the tubular member 27 is threaded into the tubular member 28 to move the adjusting screw 30, and, thus, the fulcrum pin 34 to the right for a purpose hereinafter described.

The fulcrum pin 34 has a rounded end 37 provided with a reduced cylindrical extension 38 received in an aperture 39 of a lever 40, the lever 40 having an arcuate portion 41 engaging the rounded end 37 of the fulcrum pin 34.

One end 42 of the lever 40 is bifurcated in the manner illustrated in FIGURES 1 and 2 to receive an extension 43 on the movable wall 44 of a temperature responsive device 45 having a wall 46 fixed to the housing part 16. The interior of the temperature responsive device 45 is interconnected to a temperature sensing bulb 47 by a conduit 48, the temperature sensing bulb 47 being disposed in the oven 12.

The other end 49 of the lever 40 has an aperture 50 passing therethrough and defining a plurality of outwardly directed tangs 51 in the manner illustrated in FIGURES 1 and 2. A compression spring 52 is disposed between the housing parts 16 and the end 49 of the lever 40 to tend to maintain the same in assembled position on the fulcrum pin 34 regardless of the pivotal position of the lever 40 relative to the fulcrum pin 34, the compression spring 52 having the smaller end thereof disposed around the projections 51 of the lever 40 to prevent sidewise movement of the spring 52.

The end 49 of the lever 40 carries an L-shaped member 53 having the arm 54 thereof projecting through an opening 55 in a valve seat member 56 threadedly received in a bore means 57 of the passage means 19. The valve seat member 56 has an annular valve seat 58 surrounding the opening 55 thereof and facing toward a flat surface 59 of the housing part 15, the flat surface 59 having a small projection 60 for a purpose hereinafter described.

A spider-like spring means 61 is provided and has a central flat portion 62 provided with an aperture 63 adapted to receive the projection 60 on the housing member 15 in the manner illustrated in FIGURE 1, the spring member 61 having a plurality of angularly disposed resilient means 61 having a plurality of angularly disposed resilient fingers 64 formed integrally therewith and having turned ends 65 adapted to engage against an annular flat surface 66 of a valve member 67.

The valve member 67 is carried by the spring means 61 as a plurality of L-shaped arms 68 are formed integrally with the portion 62 of the spring means 61 and have turned ends 69 adapted to extend over the valve member 67 in the manner illustrated in FIGURE 1.

Thus, when the spring means 61, valve member 67 and valve seat member 56 are assembled in the bore 57 of the housing part 15, the resilient fingers 64 of the spring means 61 tend to maintain the valve member 67 in sealing relation against the valve seat 58 to prevent communication between the passageway 19 and a chamber 70 defined between the housing parts 15 and 16.

The housing part 16 carries an outlet fitting 71 which interconnects the chamber 70 with the main burner means 11 by means of a conduit 72.

After the fulcrum pin and parts 56, 67 and 61 have been assembled to the housing part 15, the lever 40 can be placed in position on the end 37 of the fulcrum pin 34 and the housing part 16 with its interconnected outlet nipple 71 and power element 45 can be assembled to the housing part 15 whereby the end 54 of the L-shaped member 53 carried by the lever 40 will be adapted to engage the valve member 67 for a purpose hereinafter described. Therefore, it can be seen that the parts between the housing members 15 and 16 can be substantially automatically assembled together to provide the control device 10 of this invention.

The housing part 15 has a pilot burner outlet 73 interconnected to a pilot burner 74 by a conduit 75, the pilot burner 74 being disposed sufficiently close to the main burner means 11 so that the pilot burner 74, when having a flame, is adapted to ignite fuel issuing from the main burner means 11 in a manner hereinafter described.

The pilot outlet port 73 is interconnected to the passageway 19 by a branch passage means 76, the passage means 76 having an adjusting screw 77 provided therein to vary the degree of interconnection between the passage means 19 and the pilot outlet port 73.

The operation of the control device 10 of this invention will now be described.

When the operator desires to utilize the oven 12, the operator turns the control knob 23 in the proper direction from its "off" position to its "pilot" light position whereby the valve member 20 has been rotated to such a position that the fuel inlet is interconnected to the passage means 19 thereof and will pass through the branch passage means 76 to the pilot burner 74 whereby the fuel issuing from the pilot burner 74 can be ignited either automatically or manually.

After the pilot 74 has been lit, the control knob 23 is turned to the desired temperature setting for the oven 12 whereby the valve member 20 has been rotated to the proper position to give a full flow of fuel between the fuel inlet and the passage means 19 so that the valve member 20 remains stationary in this position even though the control knob 23 can be turned to a higher temperature setting position.

As the control knob 23 is being turned to the desired temperature setting for the control device 10, it can be seen that the tubular member 27 is rotated with the control knob 23 whereby the same moves to the left relative to the tubular member 28 so that the fulcrum pin 34 can move therewith to a particular axial position of the fulcrum pin 34 relative to the housing means 13 for the particular temperature setting of the control knob 23.

Since the temperature of the oven 12 is below the temperature selected by the control knob 23, the movable wall 44 of the power element 45 is in such a position relative to the axial position of the fulcrum pin 34, that the compression spring 52 has moved the arm 54 of the L-shaped member 53 to the left to open the valve member 67 away from the valve seat 58 whereby fuel is adapted to flow from the passage means 19 into the chamber 70 and from the chamber 70 to the main burner means 11 to be ignited by the pilot burner 74.

Fuel continues to flow to the main burner means 11 until the temperature of the oven 12 reaches the temperature setting set by the control knob 23. At this time, the movable wall 44 of the temperature responsive device 45 has moved sufficiently to the left in FIGURE 1 to cause clockwise pivoting movement of the lever 40 whereby the valve member 67 is permitted to close against the valve seat 58 and terminate the supply of fuel to the main burner means 11.

When the temperature in the oven 12 falls below the selected temperature, the movable wall 44 of the power element 45 has moved sufficiently to the right to permit the lever 40 to again open the valve member 67 whereby fuel can again issue from the burner means 11 and be ignited by the pilot burner 74.

Thus, it can be seen that the control device 10 of this invention is readily adaptable to cycle on and off the main burner means 11 to maintain the temperature in the oven 12 at the selected temperature.

When it is desired to turn off the oven 12, the operator rotates the control knob 23 back to its off position. As the control knob 23 is being moved toward its off position, the member 25 is again engaged with the drive member 36 to rotate the valve member 20 to its off position to terminate the interconnection between the inlet port and the passage means 19 whereby the flow of fuel to the passage means 19 is terminated.

In addition, the rotational movement of the control knob 23 back to its off position telescopes the tubular member 27 into the tubular member 28 to cause the adjusting screw 30 to axially move the fulcrum pin 34 to the right such a distance that regardless of the temperature being sensed by the bulb 37, the lever 40 is in such a position that the valve member 67 is disposed against the valve seat 58 at the off position of the control knob 23.

Therefore, it can be seen that the control device 10 of this invention is readily adapted to thermostatically control the operation of the oven 12 with the control device 10 having many parts thereof which are simple to manufacture and assemble together to provide an economical control device 10.

Figure 7:
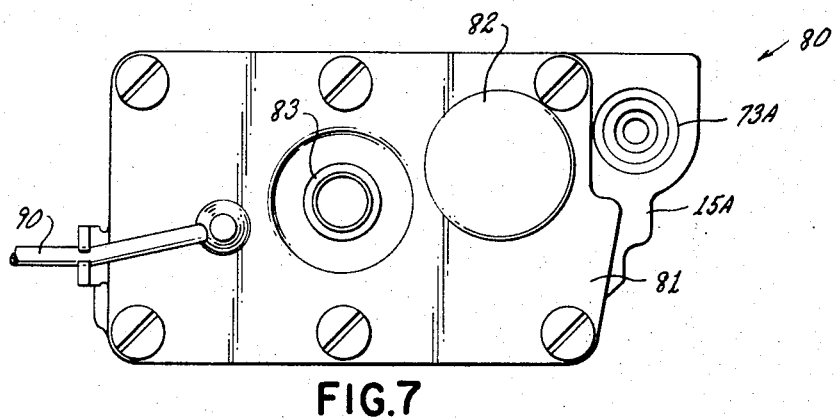
FIGURE 7 is an end view of the control device illustrated in FIGURE 5.
Figure 4:
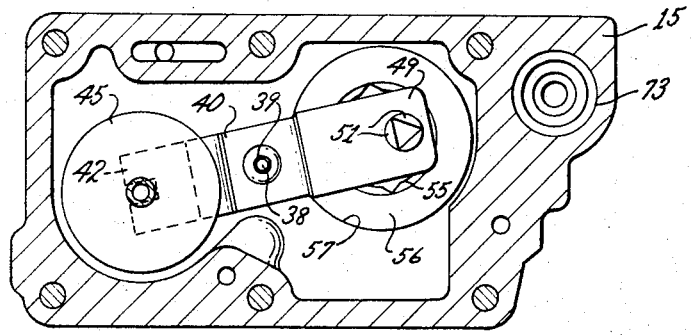
FIGURE 4 is a cross-sectional view taken on line 4—4 of FIGURE 1.
Figure 5:
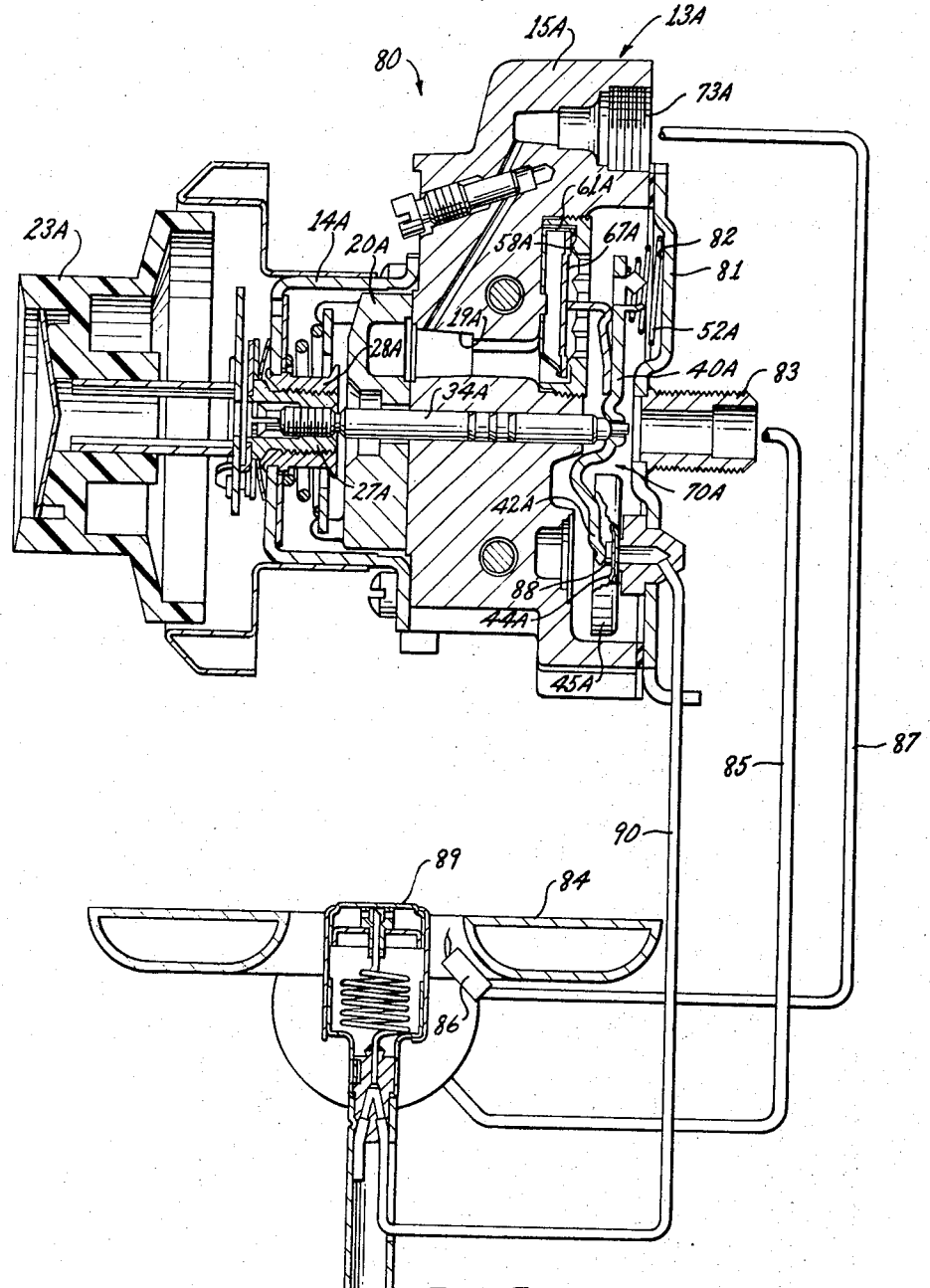
FIGURE 5 is a view similar to FIGURE 1 and illustrates another control device of this invention.

Another control device of this invention is generally indicated by the reference numeral 80 in FIGURES 5, 6, and 7, and since many of the parts thereof are substantially identical to the parts of the control device 10 previously described, the similar parts of the control device 80 will be indicated with like reference numerals followed by the reference letter A.

As illustrated in FIGURE 5, the control device 80 comprises the housing parts 14A, 15A and 81 suitably secured together to form the housing means 13A in much the same manner as housing means 13 previously described.

The housing part 81 has a depressed portion 82 receiving the compression spring 52A to tend to pivot the lever 40A in a counterclockwise direction to open the valve member 67A in opposition to the spring means 61A.

The housing part 81 carries an outlet nipple 83 adapted to interconnect the chamber 70A with a top burner means 84 by means of a conduit 85.

The pilot outlet port 73A of the control device 80 is interconnected to a pilot burner means 86 by a conduit means 87, the pilot burner means 86 being so constructed and arranged that the same is adapted to ignite fuel issuing from the burner means 84 in a manner hereinafter described.

The power element 45A carried by the housing part 81 has a projection 88 on the movable wall 44A thereof which engages the end 42A of the lever 40A. The interior of the power element 45A is interconnected to a temperature sensing bulb means 89 by a conduit 90, the temperature sensing bulb 89 being constructed in a conventional manner to sense the temperature of a cooking vessel disposed on the burner means 84 in a conventional manner.

The operation of the control device 80 will now be described.

When the operator desires to utilize the burner means 84 of the cooking apparatus or the like to cook food or the like disposed in a vessel resting on the burner means 84, the operator turns the control knob 23A in the proper direction from its "off position" to a pilot light position thereof whereby the initial rotational movement of the control knob 23A rotates the valve member 20A so that the fuel issuing from the pilot burner means 86 can be ignited manually or automatically. Further rotation of the control knob 23A in the "on" direction thereof causes the valve member 20A to fully interconnect the inlet port with the passage means 19A whereby further rotational movement of the valve member 20A is terminated even though the control knob 23A is being moved to a particular higher temperature setting position thereof. Since the control knob 23A is being moved in a direction to unthread the tubular member 27A from the tubular member 28A, the fulcrum pin 34A is moved to the left to a position for the particular temperature setting position of the control knob 23A whereby the valve member 67A opens because the bulb 89 is sensing a temperature below the selected temperature.

In this manner, fuel is adapted to flow from the passage means 19A through the open valve seat 58A to the burner means 84 and be ignited by the pilot burner means 86.

Thus, the valve member 67A remains open as long as the temperature of the cooking vessel is below the selected temperature.

However, when the temperature sensed by the bulb means 89 exceeds the selected temperature, the movable wall 44A of the power element 45A has moved to the left sufficiently to permit the lever 40A to close the valve member 67A and terminate the flow of fuel to the burner means 84. When the temperature sensing means 89 senses a temperature below the selected temperature, the movable wall 44A of the power element 45A has moved sufficiently to the right to permit the lever 40A to again open the valve member 67A so that fuel can again issue from the main burner means 44 and be ignited by the pilot burner 86.

Thus, it can be seen that the control device 80 of this invention is adapted to cycle the flow of fuel on and off to the main burner means 84 to maintain the temperature of the cooking vessel at the temperature selected by the control knob 23A.

When it is desired to turn off the control device 80, the operator turns the control knob 23A in the proper direction whereby the valve member 20A prevents communication between the fuel inlet and the passage means 19A. Also, the rotational movement of the control knob 23A back to its "off" position axially moves the fulcrum pin 34A to the right such a distance that regardless of the temperature sensed by the power element 45A, the valve member 67A will be disposed against the valve seat 58A.

Therefore, it can be seen that the control devices 10 and 80 of this invention are substantially identical for performing different functions whereby the majority of the basic parts of the control device 10 and 80 can be utilized interchangeably with only minor variations therein to adapt the particular device to a particular application.

Accordingly, it can be seen that this invention not only provides an improved control device or the like, but also this invention provides improved parts for such a control device or the like.

While the form of the invention now preferred has been disclosed as required by the statutes, other forms may be used, all coming within the scope of the claims which follow.

What is claimed is:

1. A control device having an inlet and an outlet interconnected together by a valve seat, a valve member for opening and closing said valve seat, and a spring means carried by said device and having a plurality of fingers, certain of said fingers being resilient and engaging one side of said valve member to tend to move said valve member against said valve seat, other of said fingers being disposed around said valve member to retain said valve member to said spring means, said spring means having a central plate like portion provided with an aperture passing therethrough and said device having a projection received in said aperture to hold said spring means from sidewise movement relative to said device.

2. In a control device having an inlet and an outlet, a valve seat member detachably secured in said housing, a valve member for opening and closing said valve seat and being disposed in said inlet, and a spring means carried by said device and disposed in said inlet, said spring means having a plurality of fingers, certain of said fingers being resilient and engaging one side of said valve member to tend to move said valve member against said valve seat, other of said fingers being disposed around said valve member to hold said valve member to said spring means, said spring means having a central plate-like portion provided with an aperture passing therethrough and said device having a projection received in said aperture to hold said spring means from sidewise movement relative to said device.

3. In a control device having an inlet and an outlet interconnected together by a valve seat, a valve member for opening and closing said valve seat, and a one-piece spring means carried by said device and having a plurality of fingers, certain of said fingers being resilient and engaging one side of said valve member to tend to move said valve member against said valve seat, other of said fingers being disposed around said valve member to retain said valve member to said spring means.

4. In a control device as set forth in claim 3, said valve member having a substantially flat portion and said certain fingers having bent free ends disposed against said flat portion.

5. In a control device as set forth in claim 3, said other fingers being L-shaped and having the free ends thereof bent over said valve member.

6. In a control device having an inlet and an outlet, a valve seat member detachably secured in said housing, a valve member for opening and closing said valve seat and being disposed in said inlet, and a one-piece spring means carried by said device and disposed in said inlet, said spring means having a plurality of fingers, certain of said fingers being resilient and engaging one side of said valve member to tend to move said valve member against said valve seat, other of said fingers being disposed around said valve member to hold said valve member to said spring means.

7. In a control device as set forth in claim 6, said valve seat member having an annular rib surrounding an opening therein.

8. In a control device as set forth in claim 7, said opening in said valve seat member having a polygon configuration.

References Cited

UNITED STATES PATENTS

| | | | |
|---|---|---|---|
| 2,363,451 | 11/1944 | Stockstrom | 236—99 X |
| 2,724,409 | 11/1955 | Coffey | 137—628 |
| 2,749,842 | 6/1956 | Angell et al. | 267—1 |
| 3,259,383 | 7/1966 | Johnson et al. | 267—1 |

FOREIGN PATENTS 692,587  6/1953  Great Britain.

WILLIAM F. O'DEA, *Primary Examiner.*

D. R. MATTHEWS, *Assistant Examiner.*